US011373271B1

(12) United States Patent
Da Silva Quelhas et al.

(10) Patent No.: US 11,373,271 B1
(45) Date of Patent: Jun. 28, 2022

(54) ADAPTIVE IMAGE WARPING BASED ON OBJECT AND DISTANCE INFORMATION

(71) Applicant: Apple Inc., Cupertino, CA (US)

(72) Inventors: Pedro Manuel Da Silva Quelhas, Sunnyvale, CA (US); Moinul Khan, San Jose, CA (US); Raffi A. Bedikian, Mountain View, CA (US); Katharina Buckl, Starnberg (DE); Mohamed Selim Ben Himane, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/203,069

(22) Filed: Mar. 16, 2021

Related U.S. Application Data

(60) Provisional application No. 63/001,850, filed on Mar. 30, 2020.

(51) Int. Cl.
*G06T 3/00* (2006.01)
*G06T 1/60* (2006.01)
*G06F 3/01* (2006.01)
*G06T 7/50* (2017.01)
*G06T 5/00* (2006.01)

(52) U.S. Cl.
CPC ............ *G06T 3/0093* (2013.01); *G06F 3/013* (2013.01); *G06T 1/60* (2013.01); *G06T 3/0056* (2013.01); *G06T 5/005* (2013.01); *G06T 7/50* (2017.01); *G06T 2200/16* (2013.01)

(58) Field of Classification Search
None
See application file for complete search history.

(56) References Cited

U.S. PATENT DOCUMENTS 10,832,427 B1  11/2020  Eble et al.
2021/0158080 A1*  5/2021  Price .................. G06N 3/08

* cited by examiner

*Primary Examiner* — Vu Nguyen
(74) *Attorney, Agent, or Firm* — Fernando & Partners, LLP

(57) ABSTRACT

A method includes obtaining an image via an image sensor, and identifying, within the image, a physical object represented by a portion of the image. The method includes determining, based on the image, a visual feature characterizing the physical object. The method includes warping, based on the visual feature satisfying a first feature criterion, the portion of the image according to a first warping function that is based on the first feature criterion and a distance between the electronic device and a reference point. The method includes warping, based on the visual feature satisfying a second feature criterion that is different from the first feature criterion, the portion of the image according to a second warping function that is based on the second feature criterion and the distance between the electronic device and the reference point.

20 Claims, 12 Drawing Sheets

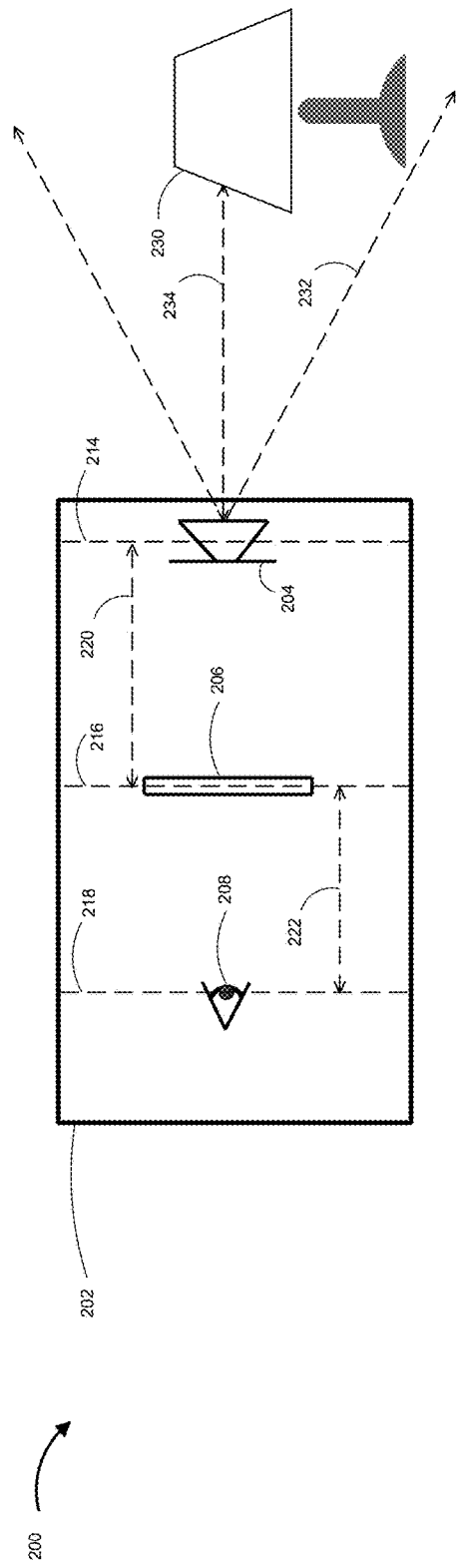
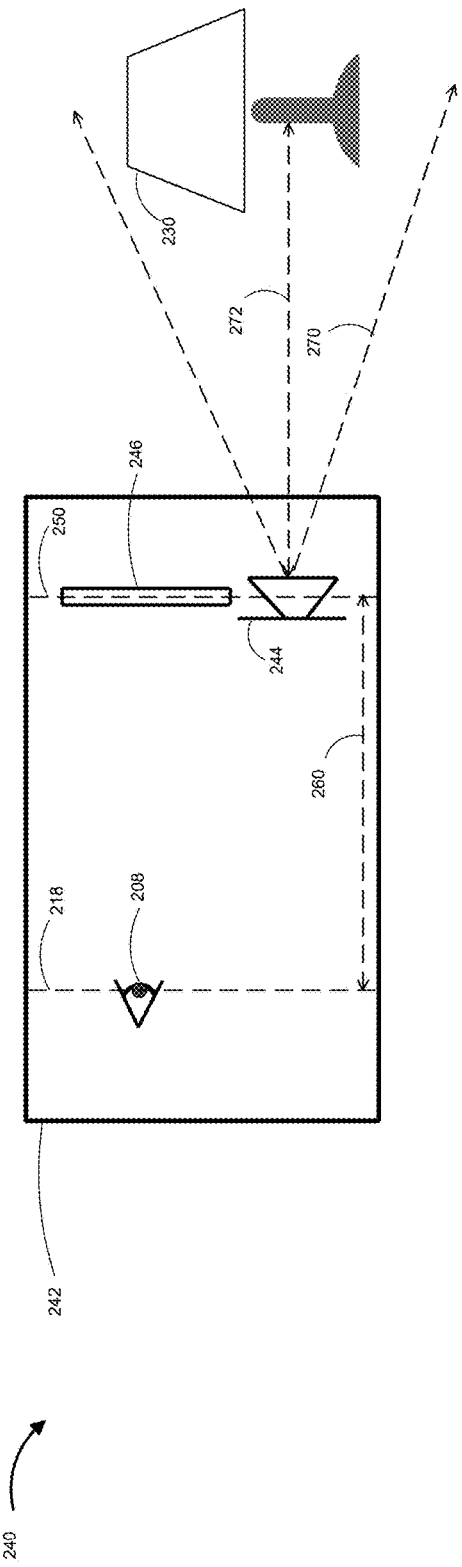
Figure 2A
Figure 2B

ADAPTIVE IMAGE WARPING BASED ON OBJECT AND DISTANCE INFORMATION

CROSS-REFERENCE TO RELATED APPLICATION

This application claims priority to U.S. Provisional Patent App. No. 63/001,850 filed on Mar. 30, 2020, which is hereby incorporated by reference in its entirety.

TECHNICAL FIELD

The present disclosure relates to warping an image, and, in particular, warping the image based on object and distance information.

BACKGROUND

Certain display systems, such as a head-mountable device (HMD), include an integrated camera and display. The camera obtains image data of a physical environment, and the display displays the corresponding display data for a user to view. The image data is obtained with respect to a camera plane that is based on the camera's position within the HMD, whereas the image data is displayed with respect to a display plane that is based on the display's position within the HMD. Accordingly, the display data exists in a display plane that is offset from an eye plane that is associated with the position of the user's eyes. This spatial offset between the eye plane and the display plane causes user discomfort (e.g., motion sickness) because the user's visual perception of the physical environment does not match a corresponding visual perception when the user is not wearing the HMD.

SUMMARY

In accordance with some implementations, a method is performed at an electronic device with one or more processors, a non-transitory memory, and an image sensor. The method includes obtaining an image via the image sensor and identifying, within the image, a physical object represented by a portion of the image. The method includes determining, based on the image, a visual feature characterizing the physical object. The method includes warping, based on the visual feature satisfying a first feature criterion, the portion of the image according to a first warping function that is based on the first feature criterion and a distance between the electronic device and a reference point. The method includes warping, based on the visual feature satisfying a second feature criterion that is different from the first feature criterion, the portion of the image according to a second warping function that is based on the second feature criterion and the distance between the electronic device and the reference point.

In accordance with some implementations, an electronic device includes one or more processors, a non-transitory memory, and an image sensor. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIGS. 2A and 2B are examples of operating environments including various distances between electronic devices and reference points.

SUMMARY

Figure 1:
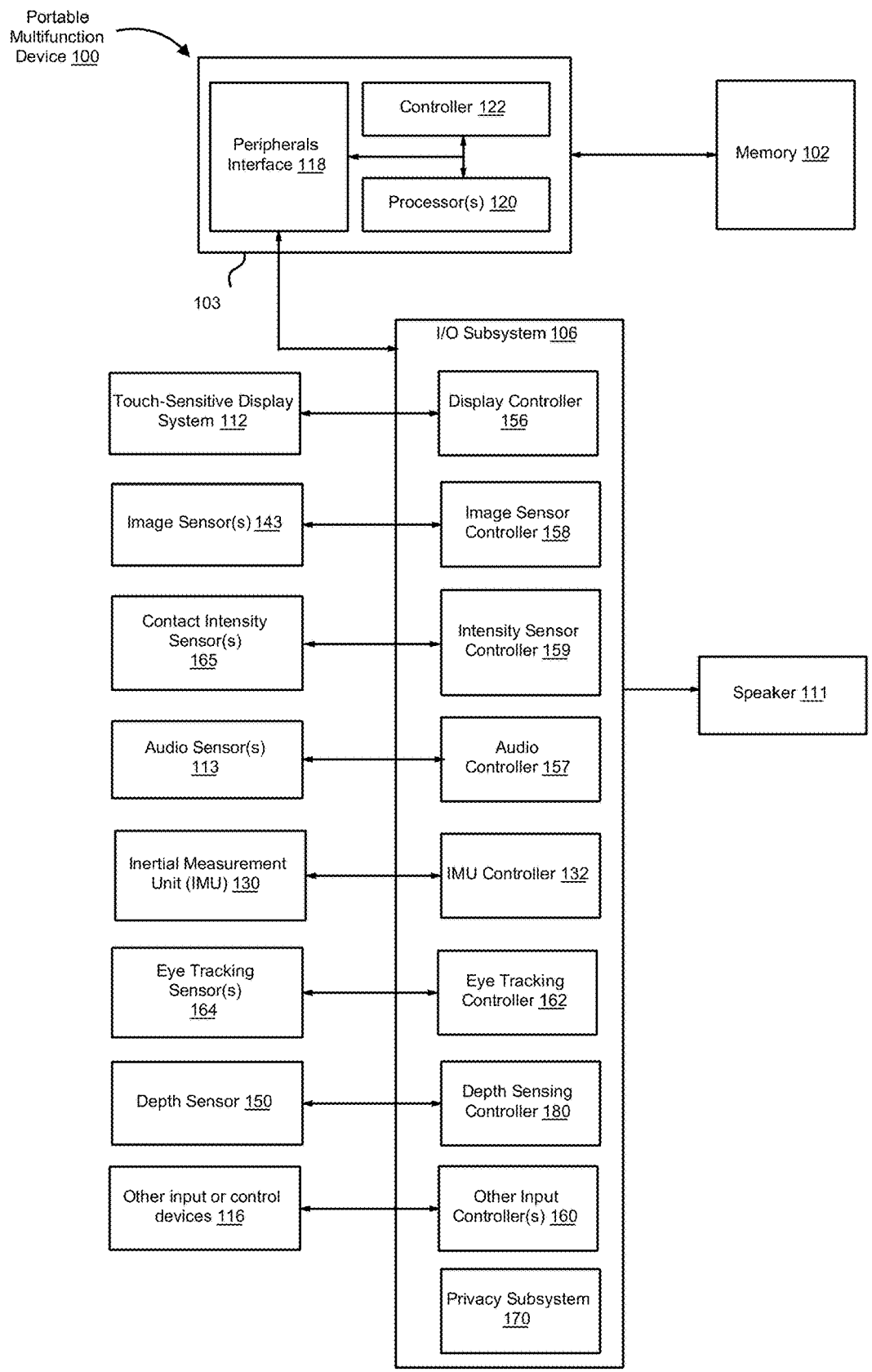
FIG. 1 is a block diagram of an example of a portable multifunction device in accordance with some implementations.

Certain display systems, such as a head-mountable device (HMD), include an integrated camera and display. The camera obtains image data of a physical environment, and the display displays the image data for a user to view. The image data is obtained with respect to a camera plane that is based on the camera's position within the HMD, whereas the image data is displayed with respect to a display plane that is based on the display's position within the HMD. When the HMD is worn by a user, the camera and the display are spatially offset (e.g., horizontally or vertically displaced) from eyes of the user. Accordingly, the displayed image data exists in a display plane that is offset from an eye plane that is associated with the position of the user's eyes. This spatial offset between the eye plane and the display plane causes user discomfort (e.g., motion sickness) because the user's visual perception of the physical environment does not match a corresponding visual perception when the user is not wearing the HMD. Moreover, using a graphics processing unit (GPU) for per-pixel rendering of an image is computationally expensive (e.g., power hungry) and may introduce undesirable latency into the graphics rendering pipeline. For example, per-pixel modification is problematic for a mobile device because the high computational demands results in high levels of heat dissipation.

By contrast, various implementations disclosed herein include methods, electronic devices, and systems that adaptively warp a portion of an image, representing a physical object, based on a visual feature of the physical object and a distance between the electronic device and a reference point. In some implementations, the visual feature indicates one or more of the type of physical object, the location of the physical object within the scene (e.g., background versus foreground), etc. As one example, a textual object is warped at a higher resolution than a background wall, thereby saving processing resources associated with processing the background wall at the higher resolution. In some implementations, the distance between the electronic device and the reference point indicates an offset between an image sensor and a portion of the physical object, an estimated distance between eyes of a user and a display device integrated in the electronic device, or a combination thereof.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a touch-sensitive display system 112, an inertial measurement unit (IMU) 130, image sensor(s) 143 (e.g., a camera), contact intensity sensor(s) 165, audio sensor(s) 113 (e.g., microphone), a depth sensor 150, eye tracking sensor(s) 164 (e.g., included within a head-mountable device (HMD)), and other input or control device(s) 116. In some implementations, the electronic device 100 corresponds to one of a mobile phone, tablet, laptop, wearable computing device, head-mountable device (HMD), head-mountable enclosure (e.g. the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more CPUs 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the touch-sensitive display system 112 and the other input or control devices 116, with the peripherals interface 118. The I/O subsystem 106 optionally includes a display controller 156, an image sensor controller 158, an intensity sensor controller 159, an audio controller 157, an eye tracking controller 162, and one or more input controllers 160 for other input or control devices, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a physical environment.

The touch-sensitive display system 112 provides an input interface and an output interface between the electronic device 100 and a user. The display controller 156 receives and/or sends electrical signals from/to the touch-sensitive display system 112. The touch-sensitive display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system 112 has a touch-sensitive surface, sensor, or set of sensors that accepts input from the user based on haptic and/or tactile contact. The touch-sensitive display system 112 and the display controller 156 (along with any associated modules and/or sets of instructions in the memory 102) detect contact (and any movement or breaking of the contact) on the touch-sensitive display system 112 and converts the detected contact into interaction with user-interface objects (e.g., one or more soft keys, icons, web pages or images) that are displayed on the touch-sensitive display system 112. In an example implementation, a point of contact between the touch-sensitive display system 112 and the user corresponds to a finger of the user or a stylus.

The touch-sensitive display system 112 optionally uses LCD (liquid crystal display) technology, LPD (light emitting polymer display) technology, or LED (light emitting diode) technology, although other display technologies are used in other implementations. The touch-sensitive display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 112.

The user optionally makes contact with the touch-sensitive display system 112 using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) 143 corresponds to one or more HMD cameras. In some implementations, the image sensor(s) 143 includes one or more depth sensors. In some implementations, the image sensor(s) 143 includes a combination of a black-and-white (BW) camera and an infrared (IR) camera.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the back of the electronic device 100.

In some implementations, the depth sensor 150 is configured to obtain depth data, such as depth information characterizing an object within an obtained image. For example, the depth sensor 150 corresponds to one of a structured light device, a time-of-flight device, and/or the like.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

FIGS. 2A and 2B are examples of operating environments including various distances between electronic devices and reference points. FIG. 2A illustrates a first operating environment 200 that includes a first electronic device 202 (e.g., a head-mountable device (HMD)). The first electronic device 202 includes a first image sensor 204 in a first plane 214 and a first display device 206 in a second plane 216. Moreover, while the first electronic device 202 is being worn by a user (e.g., on the head of the user), the first electronic device 202 includes eyes 208 of the user in a third plane 218. The first plane 214, the second plane 216, and the third plane 218 are spatially offset from each other.

The first operating environment 200 also includes a lamp 230. The lamp 230 is within a first field of view 232 of the first image sensor 204. One of ordinary skill in the art will appreciate that the portion of the lamp 230 may correspond to different portions of the lamp 230, such as is illustrated in FIG. 2B.

The first image sensor 204 obtains image data including the lamp 230. However, because of a first distance 220 between the first image sensor 204 and the first display device 206, and a second distance 222 between the first display device 206 and the eyes 208, the first electronic device 202 displays the obtained image data in the second plane 216 (e.g., display plane) that is spatially offset from the third plane 218 (e.g., eye plane). This spatial offset between the eye plane and the display plane causes user discomfort (e.g., motion sickness) because the user's visual perception of the physical environment does not match a corresponding visual perception when the user is not wearing the first electronic device 202.

In order to address the spatial offset, as will be detailed below, various implementations disclosed herein utilize a distance between the first electronic device 202 and a reference point in order to perform image warping. For example, with reference to FIG. 2A, in some implementations, the first electronic device 202 utilizes the first distance 220 for warping the image. As another example, in some implementations, the first electronic device 202 utilizes the second distance 222 for warping the image, wherein the eyes 208 correspond to the reference point. As another example, in some implementations, the first electronic device 202 utilizes a third distance 234 between the first image sensor 204 and a portion of the lamp 230, wherein the portion of the lamp 230 corresponds to the reference point. As yet another example, in some implementations, the first electronic device 202 utilizes a combination of the first distance 220, the second distance 222, and the third distance 234 for warping the image.

FIG. 2B illustrates a second operating environment 240 that includes a second electronic device 242 including a second image sensor 244 and a second display device 246. The second image sensor 244 includes, in a second field of view 270, the lamp 230. A fourth distance 272 separates the second image sensor 244 and a portion of the lamp 230, corresponding to approximately the middle of the body of the lamp 230.

In contrast to the components integrated in the first electronic device 202 illustrated in FIG. 2A, the second image sensor 244 and the second display device 246 exist in a common plane 250. Nevertheless, the eyes 208 exist in the third plane 218 that is spatially offset from the common plane 250 by a fifth distance 260. Accordingly, as described above with respect to FIG. 2A, the user experiences discomfort resulting from the spatial offset (e.g., the fifth distance 260) between the eyes 208 and the second display device 246 that displays image data obtained by the second image sensor 244.

In order to address the spatial offset, as will be detailed below, various implementations disclosed herein utilize a distance between the second electronic device 242 and a reference point in order to perform image warping. For example, in some implementations, the second electronic device 242 utilizes the fourth distance 272 for warping the image, wherein the portion of the lamp 230 corresponds to the reference point. As another example, in some implementations, the second electronic device 242 utilizes the fifth distance 260 for warping the image, wherein the eyes 208 corresponds to the reference point.

FIGS. 3A-3H are examples of warping an image based on object and distance information in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, warping the image is performed by the electronic device 100 or portions thereof.

Figure 3A:
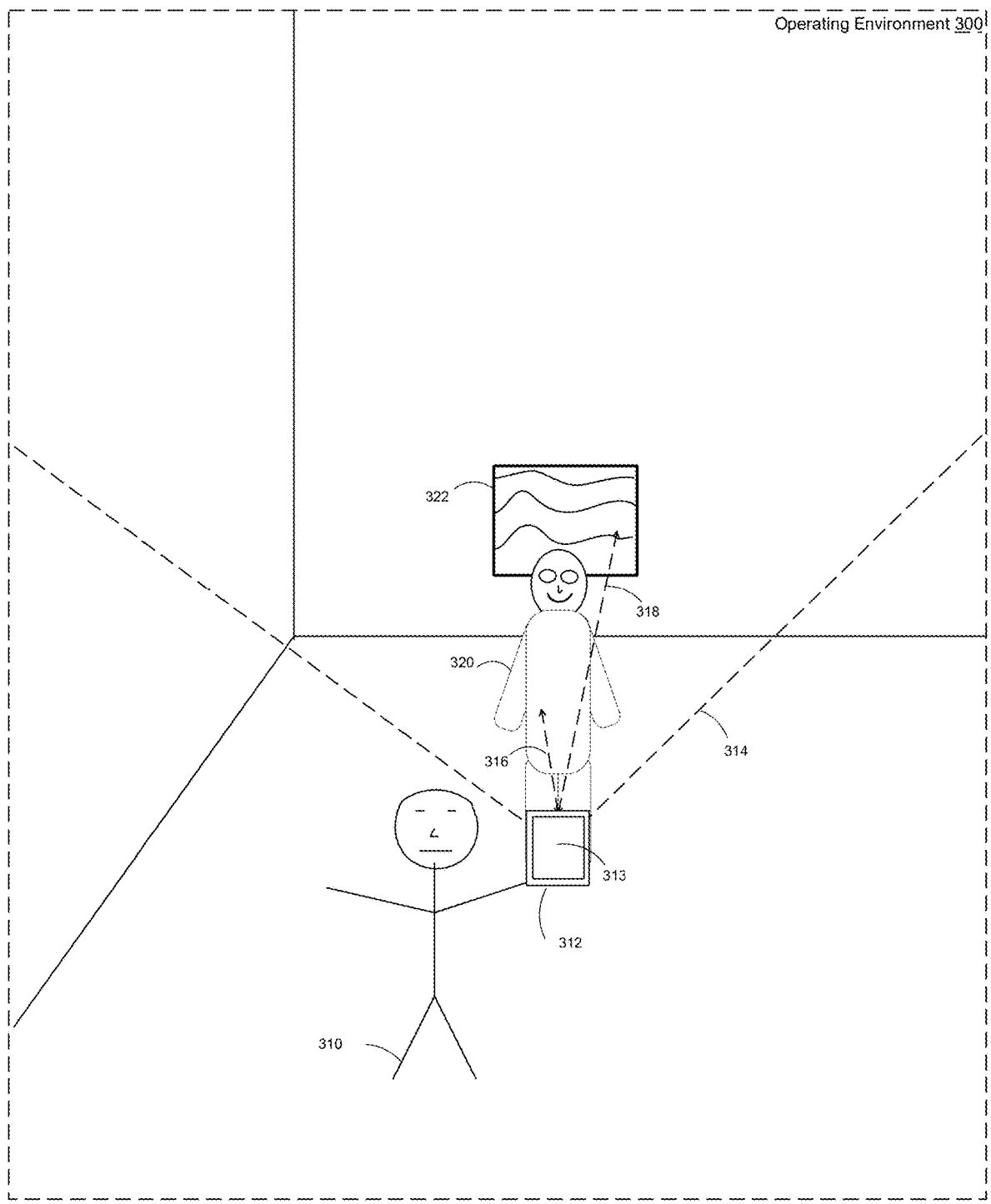
FIGS. 3A-3H are examples of warping an image based on object and distance information in accordance with some implementations.

As illustrated in FIG. 3A, an operating environment 300 includes a user 310 holding an electronic device 312 including a display device 313. In some implementations, the electronic device 312 corresponds to the first electronic device 202 in FIG. 2A or the second electronic device 242 in FIG. 2B. In some implementations, the electronic device 312 corresponds to a mobile device, such as a smartphone, tablet, media player, laptop, etc. In some implementations, the electronic device 312 corresponds to a head-mountable device (HMD) that is mountable on the head of the user 310. In some implementations, the HMD includes a head-mountable enclosure. In various implementations, the head-mountable enclosure includes an attachment region to which another device with a display device can be attached. In various implementations, the head-mountable enclosure is shaped to form a receptacle for receiving another device that includes a display device. For example, in some implementations, the electronic device 312 slides/snaps into or otherwise attaches to the head-mountable enclosure. In some implementations, the display of the device attached to the head-mountable enclosure presents (e.g., displays) an image. For example, in some implementations, the electronic device 312 corresponds to a mobile phone that can be attached to the head-mountable enclosure.

The electronic device 312 includes an image sensor (e.g., a rear-facing camera) that is associated with a field of view 314 that includes a physical individual 320 and a physical painting 322. Accordingly, the image sensor obtains image data (e.g., a single image or a series of images) that includes representations of the physical individual 320 and the physical painting 322. The image sensor is a first distance 316 away from the physical individual 320 and a second distance 318 away from the physical painting 322. The first distance 316 is less than the second distance 318 because the physical painting 322 is behind the physical individual 320 in the operating environment 300.

Figure 3B:
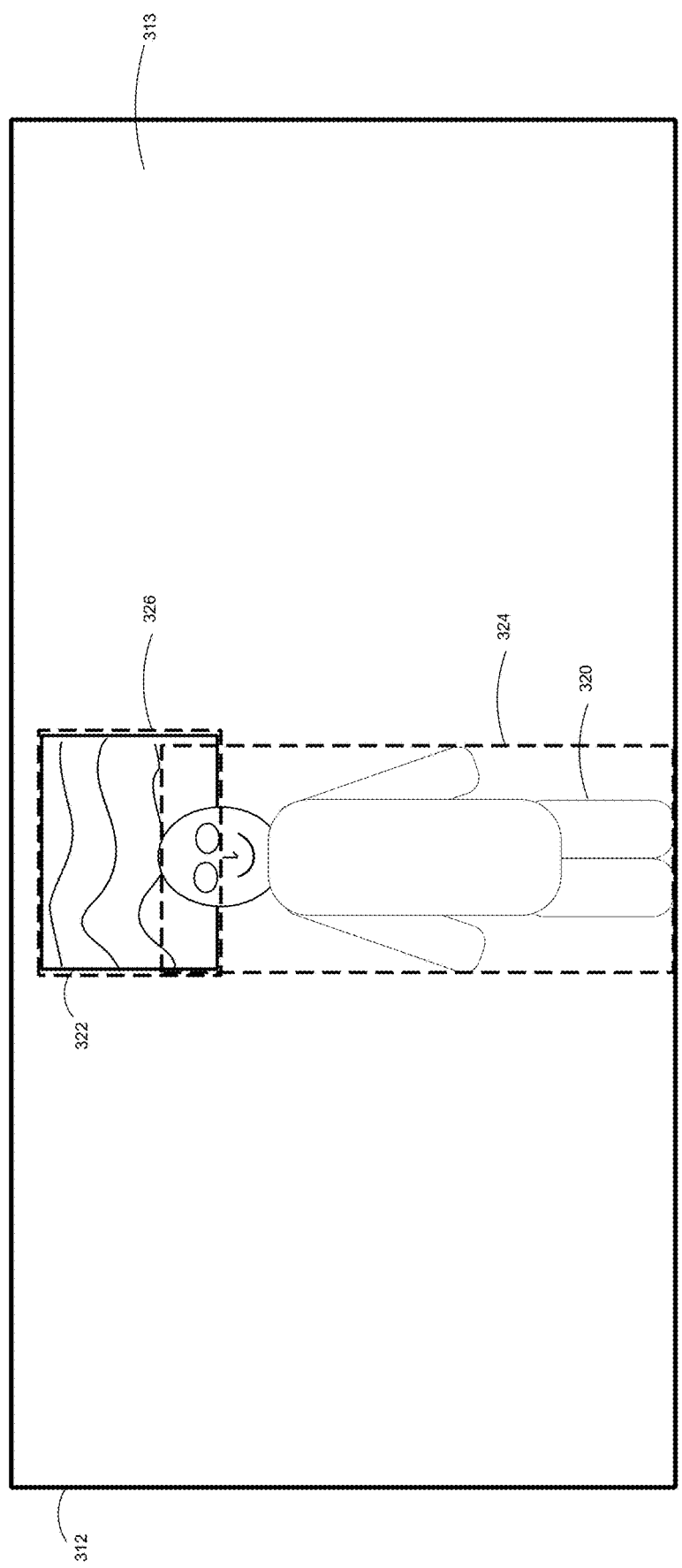

FIG. 3B illustrates the electronic device 312 displaying, via the display device 313, an image including representations of the physical individual 320 and the physical painting 322. The electronic device 312 identifies, within the image, the representation of the physical individual 320 and the representation of the physical painting 322, as are respectively indicated by a first bounding box 324 and a second bounding box 326. The first bounding box 324 and the second bounding box 326 are illustrated in FIG. 3B for purely explanatory purposes. In some implementations, the electronic device 312 identifies physical objects via instance segmentation, in which the physical objects are identified without a determination as to a meaning or an understanding of the physical objects, such as "Object No. 1," "Object No. 2," etc. In some implementations, the electronic device 312 identifies physical objects via semantic segmentation, in which the physical objects are identified with a determination as to a meaning or an understanding of the physical objects, such as "person" or "painting."

The electronic device 312 determines, based on the image, visual features characterizing respective representations of physical objects. For example, with reference to FIG. 3A, the electronic device 312 determines the first distance 316 and the second distance 318 by utilizing a combination of image sensor(s) and depth sensor(s). Continuing with this example, the electronic device 312 determines that the representation of the physical individual 320 has a foreground visual feature and the representation of the physical painting 322 has a background visual feature. For example, the electronic device 312 determines the foreground visual feature and the background visual feature by comparing the first distance 316 and the second distance 318 against each other (e.g., the first distance 316 is less than the second distance 318).

Figure 3C:
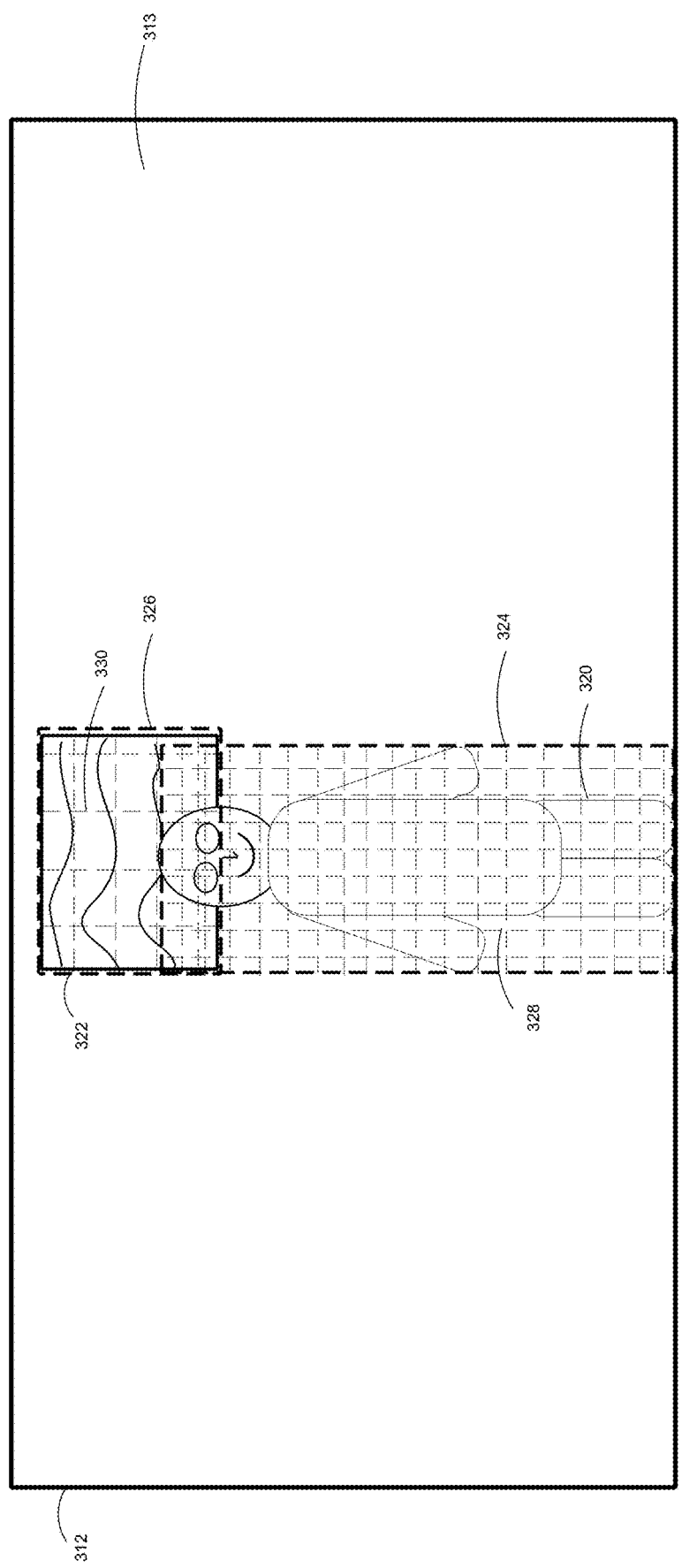
Figure 3D:
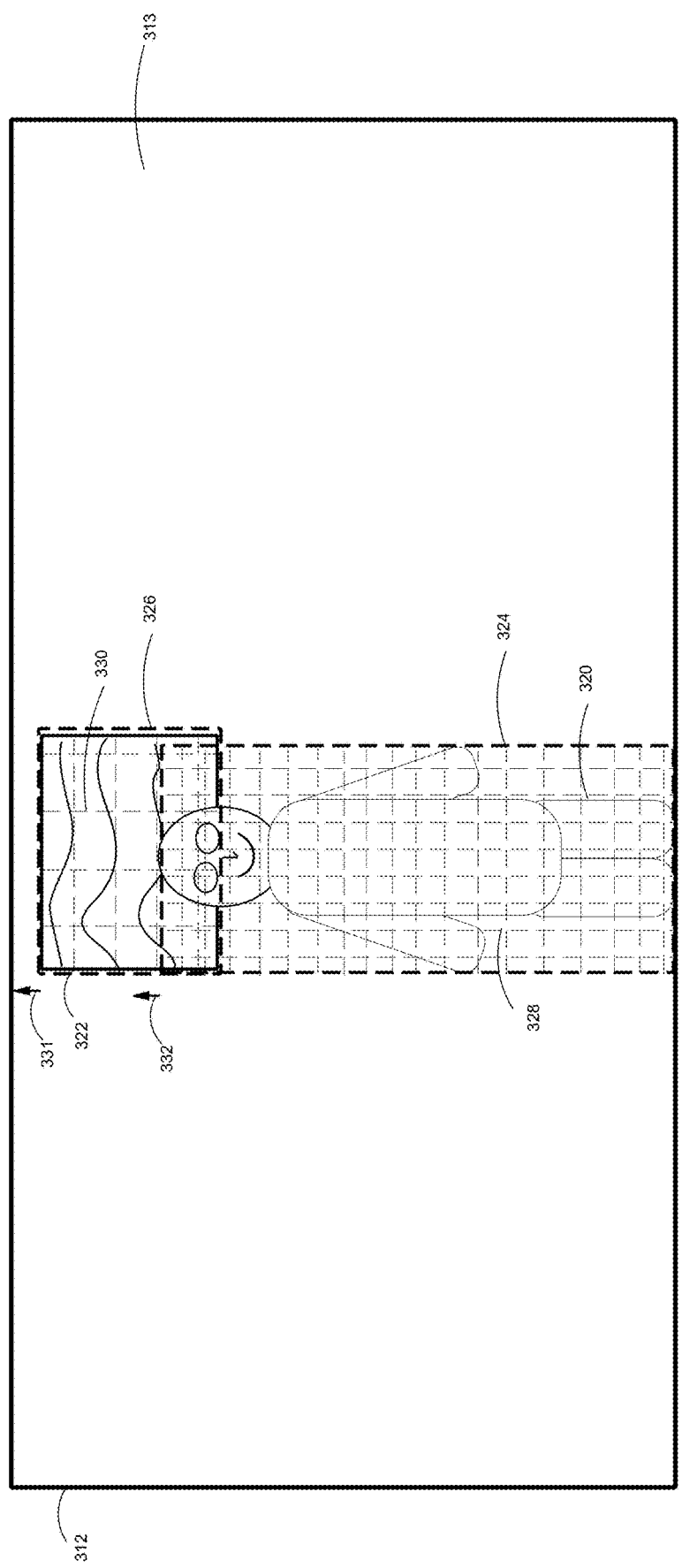
Figure 3E:
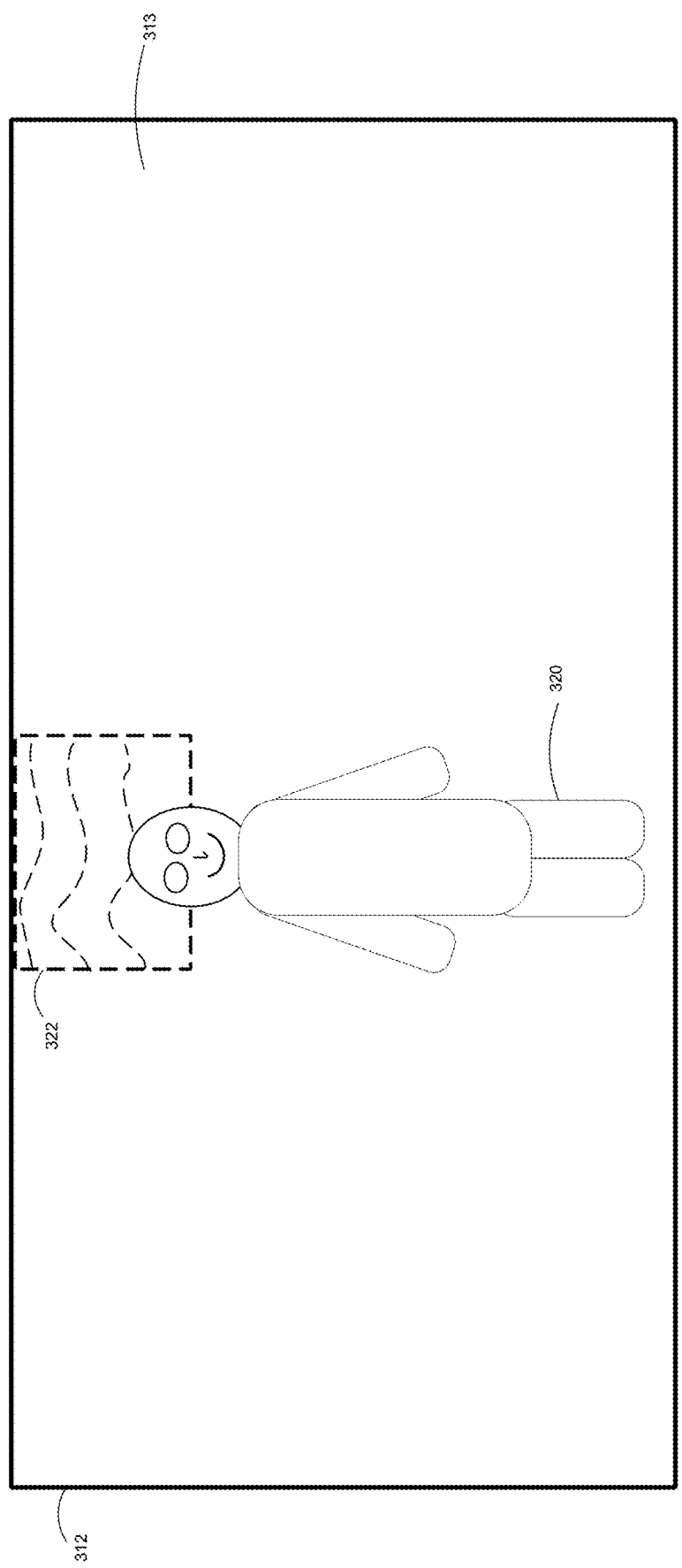

As illustrated in FIGS. 3C-3E, the electronic device 312 warps the image based on different warping functions associated with the representation of the physical individual 320 and the representation of the physical painting 322. To that end, the electronic device 312 determines a first warping function that is associated with the representation of the physical individual 320, and determines a second warping function that is associated with the representation of the physical painting 322.

The first warping function is based on a visual feature associated with the representation of the physical individual 320, such as the foreground visual feature described above. The first warping function is also based on a distance between the electronic device 312 and a reference point, such as a distance between eyes of the user 310 and the display device 313, a distance between an image sensor of the electronic device 312 and the physical individual 320, a distance between the image sensor of the electronic device 312 and the display device 313, and/or a combination thereof.

The second warping function is based on a visual feature associated with the representation of the physical painting 322, such as the background visual feature described above. The second warping function is also based on a distance between the electronic device 312 and the reference point, such as a distance between eyes of the user 310 and the display device 313, a distance between an image sensor of the electronic device 312 and the physical painting 322, a distance between the image sensor of the electronic device 312 and the display device 313, and/or a combination thereof.

In some implementations, as illustrated in FIG. 3C, determining the first warping function includes determining a first grid 328 associated with the representation of the physical individual 320. Moreover, determining the second warping function includes determining a second grid 330 associated with the representation of the physical painting 322. In some implementations, the first grid 328 has a larger grid size than the second grid 330 because the first grid 328 is associated with a foreground physical object (e.g., physical individual 320), whereas the second grid 330 is associated with a background physical object (e.g., physical painting 322). As another example, in some implementations, the electronic device 312 warps a portion of the image including a foreground physical object at a higher granularity level than a portion of the image including a background physical object. Other examples of warping based on visual feature(s) are detailed below.

In some implementations, as illustrated in FIG. 3D, determining the first warping function includes determining a first distance warp value 332 associated with the physical individual 320. Moreover, determining the first warping function includes determining a second distance warp value 331 associated with the physical painting 322.

As illustrated in FIG. 3E, the electronic device 312 warps (e.g., generates a warped image based on the image) the representation of the physical individual 320 based on the first warping function, and warps the representation of the physical painting 322 based on the second warping function. As compared with the representation of the physical individual 320 in FIG. 3D, the representation of the physical individual 320 is moved upward according to the first distance warp value 332 in FIG. 3E. Moreover, as compared with the representation of the physical painting 322 in FIG. 3D, the representation of the physical painting 322 is moved upward according to the second distance warp value 331 in FIG. 3E.

Moreover, the electronic device 312 warps the representation of the physical individual 320 according to the first grid 328, and warps the representation of the physical painting 322 according to the second grid 330. The first grid 328 is associated with a higher granularity level than the second grid 330. Namely, as illustrated in FIG. 3E, the representation of the physical painting 322 has a noticeably lower resolution (e.g., dotted lines) than the representation of the physical painting 322 in the previous (e.g., unwarped) image. Accordingly, the electronic device 312 utilizes fewer computational resources and less power by adaptively warping different portions of the image at different granularity levels, rather than warping the entirety of the image at the same granularity level.

Figure 3F:
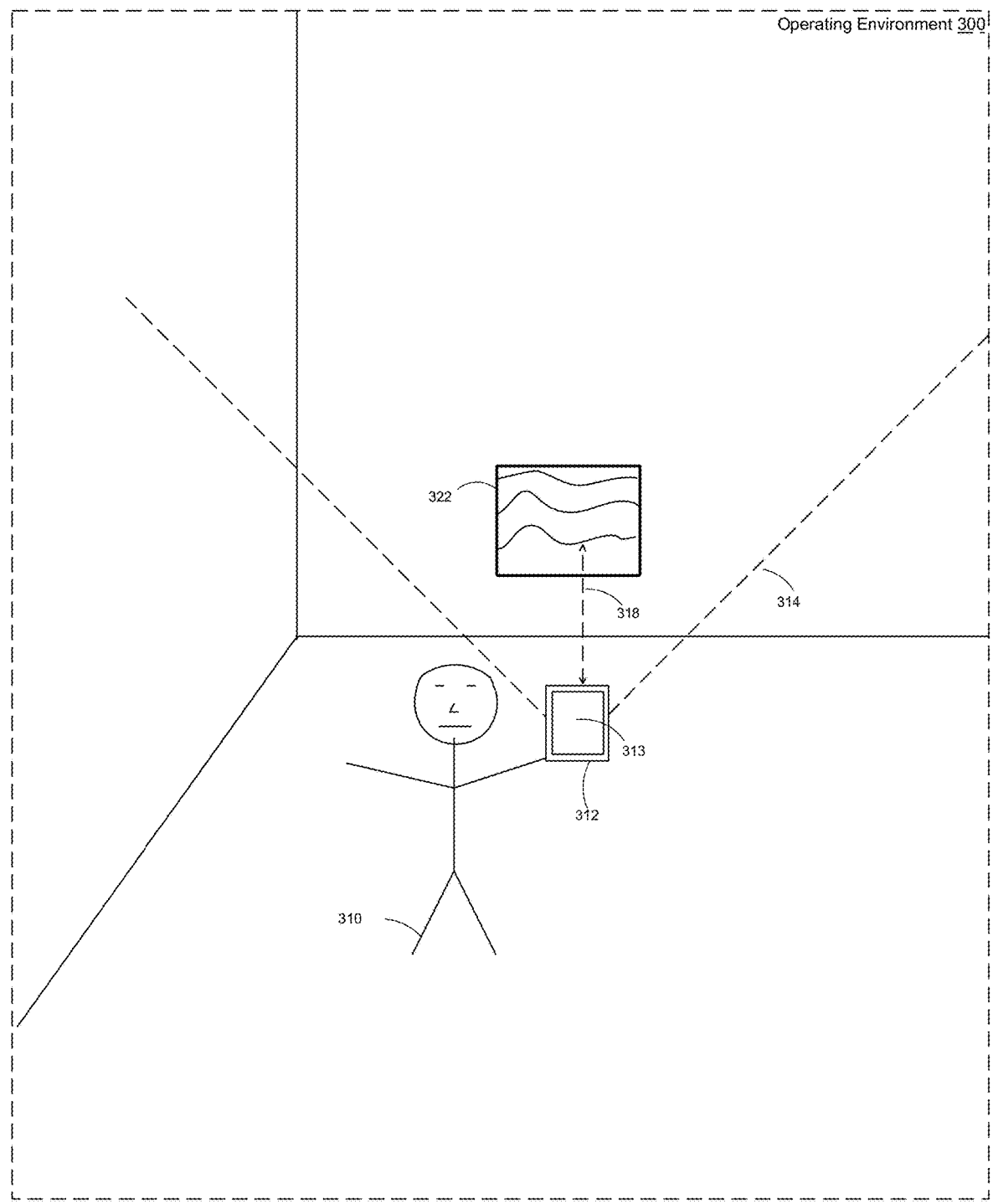

As illustrated in FIG. 3F, the physical individual 320 has left the operating environment 300 and the user 310 has moved closer to the physical painting 322 within the operating environment 300.

Figure 3G:
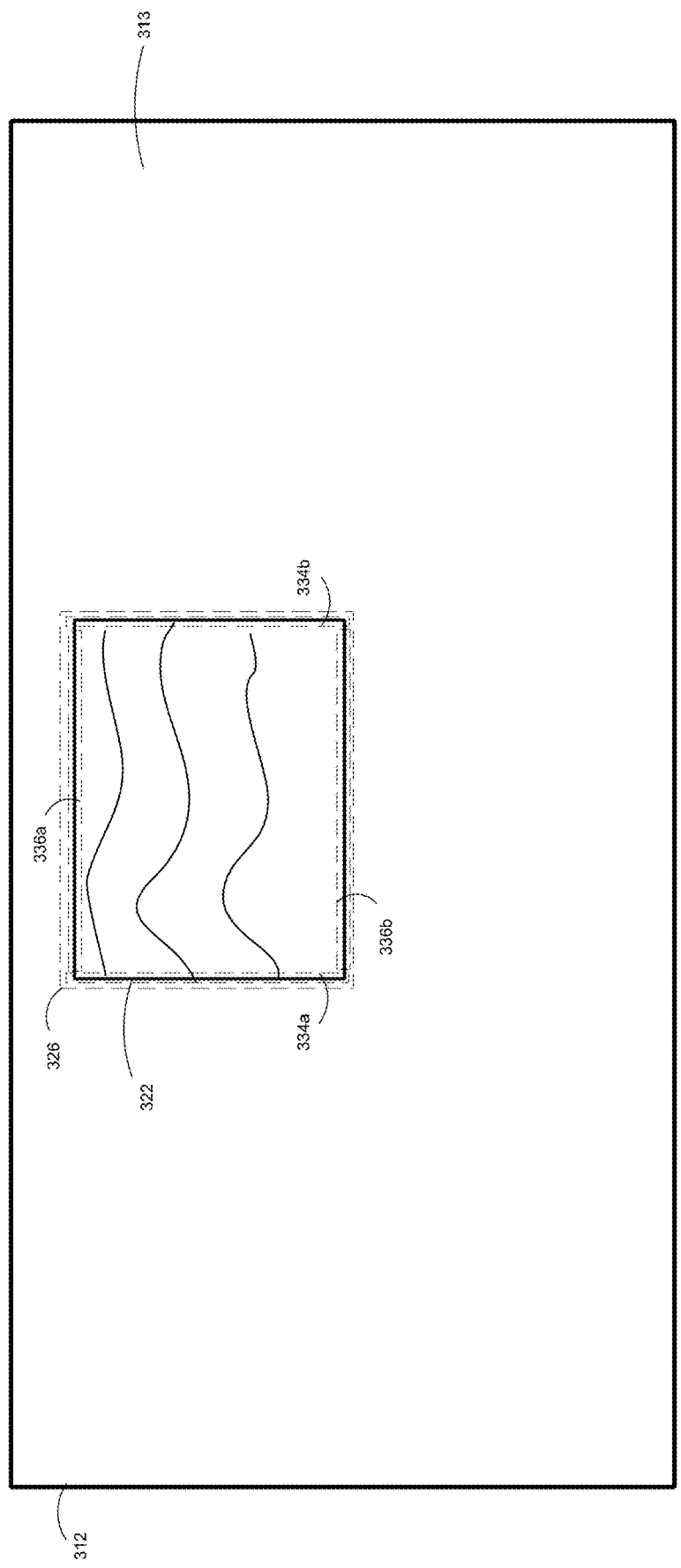
Figure 3H:
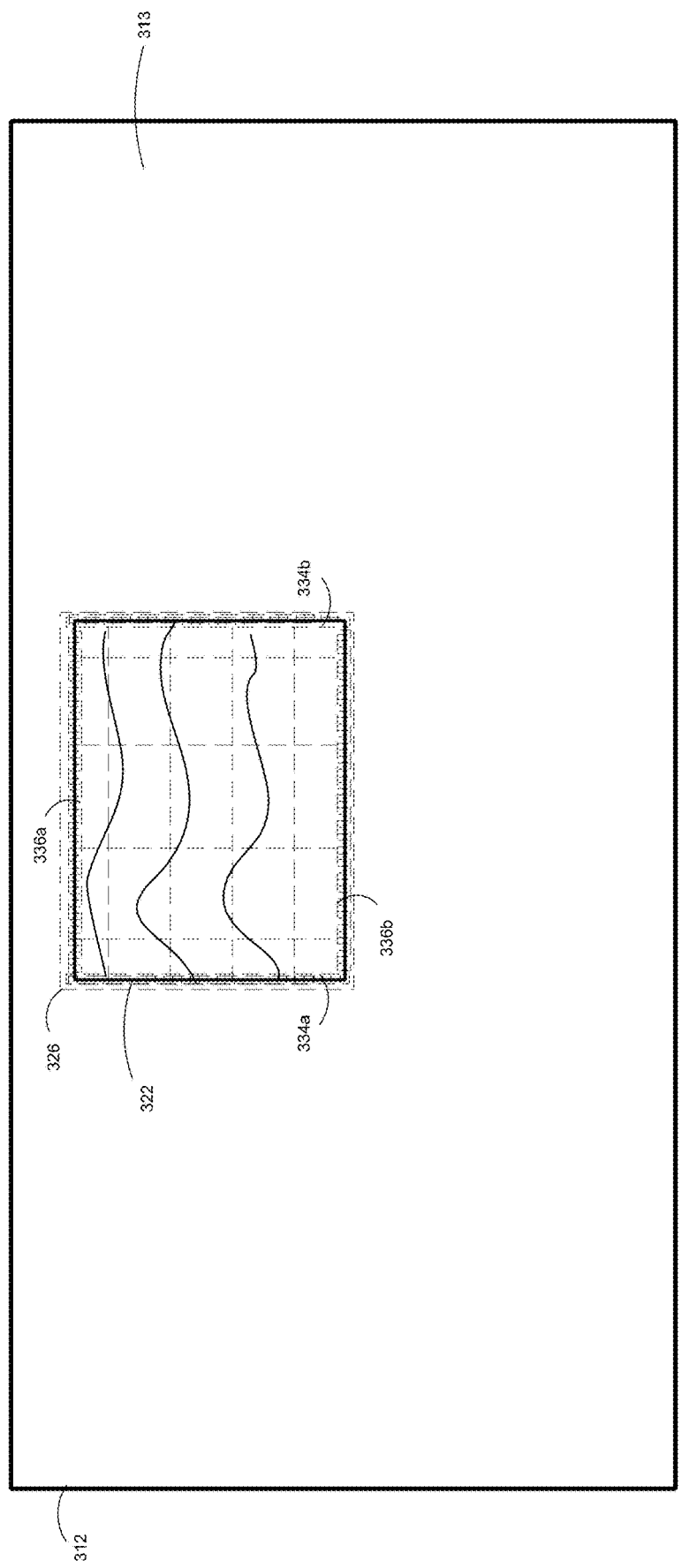

As illustrated in FIGS. 3G and 3H, the electronic device 312 determines different visual features (e.g., edges) characterizing the representation of the physical painting 322. As described above, in some implementations, the electronic device 312 identifies, within the image, the representation of the physical individual painting 322, as is indicated by the second bounding box 326 in FIG. 3G. Moreover, the electronic device 312 identifies edges the representation of the physical painting 322. Namely, the electronic device 312 identifies a first vertical edge 334a corresponding to the left edge of the representation of the physical painting 322, and identifies a second vertical edge 334b corresponding to the right edge of the representation of the physical painting 322. Moreover, the electronic device 312 identifies a first horizontal edge 336a corresponding to the top edge of the representation of the physical painting 322, and identifies a second horizontal edge 336b corresponding to the bottom edge of the representation of the physical painting 322.

As illustrated in FIG. 3H, the electronic device 312 determines different warping granularity levels based on the visual features of the representation of the physical painting 322. Namely, the electronic device 312 determines a first granularity level associated with the edges of the representation of the physical painting 322 and a second granularity level associated with the remainder of (e.g., the inner portion of) the representation of the physical painting 322. As illustrated in FIG. 3H, the first granularity level is greater than the second granularity level. Because the edges of a particular physical object are where the particular physical object connects to other physical objects, the electronic device 312 may warp the edges at a relatively high granularity level in order to provide a clear visual demarcation of the particular object with respect to the other physical objects. Moreover, the electronic device 312 utilizes fewer computational resources and less power by adaptively warping different portions of the image at different granularity levels, rather than warping the entirety of the image at the same granularity level.

Figure 4:
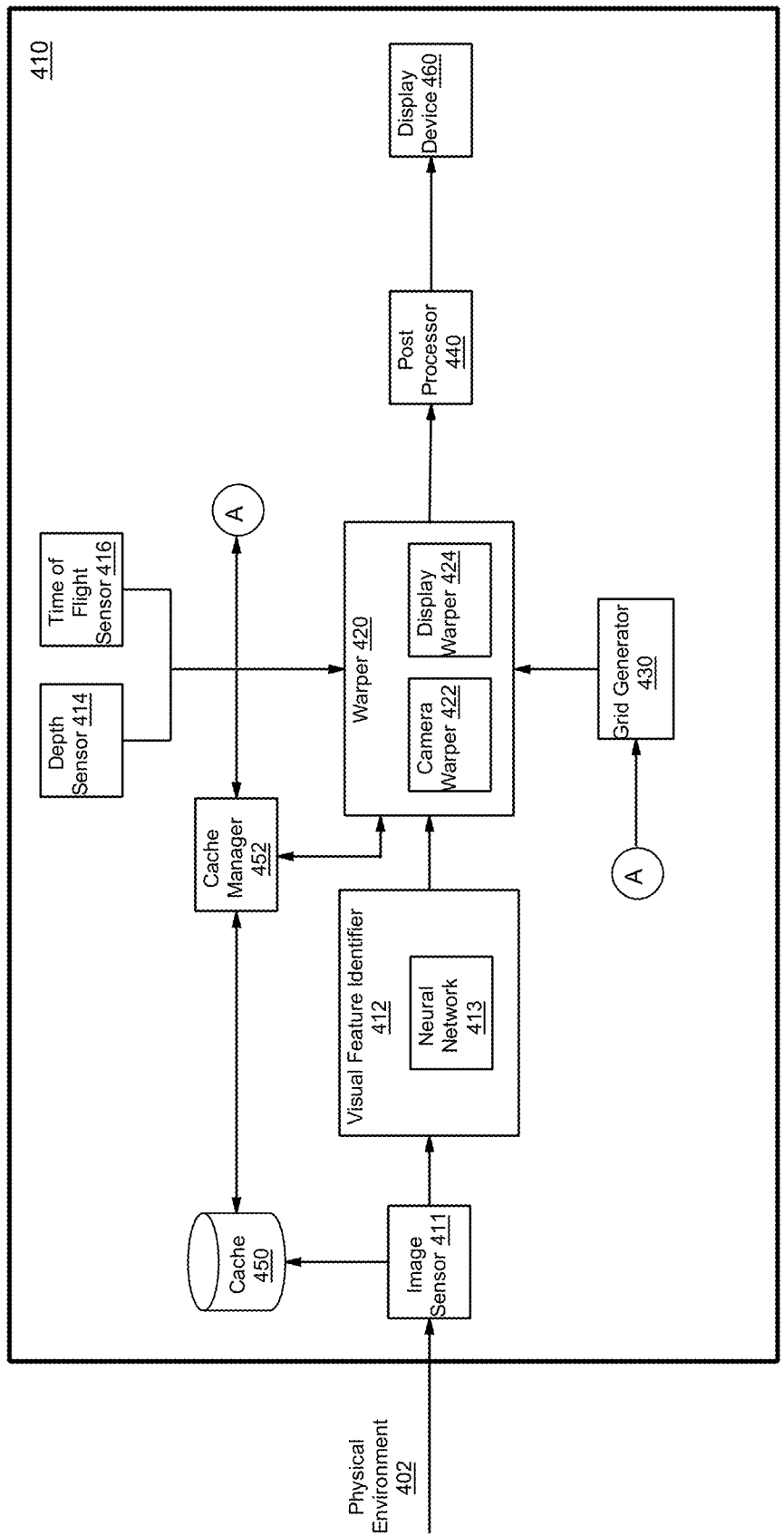
FIG. 4 is an example of a block diagram for warping an image based on object and distance information in accordance with some implementations.

FIG. 4 is an example of a block diagram 410 for warping an image based on object and distance information in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, the block diagram 410 or portions thereof are implemented by corresponding portions of the electronic device 100. In some implementations, the block diagram 410 is integrated within an electronic device (e.g., a mobile phone, a tablet) or an HMD.

The block diagram 410 includes an image sensor 411 that obtains an image of a physical environment 402, such as the image described with reference to FIGS. 3A-3H. The image includes representations of physical objects, such as the representation of the physical individual 320 and the representation of the physical painting 322 illustrated in FIG. 3B.

The block diagram 410 includes a visual feature identifier 412 that identifies, within the image, a physical object represented by a portion of the image. Moreover, the visual feature identifier 412 determines, based on the image, a visual feature characterizing the physical object. For example, the visual feature corresponds to one or more of the type of physical object (e.g., a structural object (wall, floor), a movable object, textual object, etc.); dimensions of the physical object; location of edges of the object; and/or the like. In some implementations, the visual feature identifier 412 identifies, within the image, the representation of the physical object via instance segmentation or semantic segmentation. To that end, in some implementations, the visual feature identifier 412 includes a neural network 413 that performs instance segmentation or semantic segmentation.

In some implementations, the visual feature is indicative of different depth values characterizing different representations of physical objects within the image, such as described with reference to FIGS. 3A-3E. To that end, the block diagram 410 includes a combination of a depth sensor 414 that senses the depth information associated with the physical environment 402 and a time of flight sensor 416 that obtains time of flight information, from which the depth information may be determined.

The block diagram 410 includes a warper 420 that determines a warping function associated with the representation of the physical object, and warps the representation of the physical object based on the warping function. The warping function is based on the visual feature and based on a distance between a component of the block diagram 410 and a reference point. In various implementations, the block diagram 410 utilizes a combination of the depth sensor 414 and the time of flight sensor 416 in order to determine the distance between the block diagram 410 and the reference point. For example, the distance between the block diagram 410 and the reference point corresponds to a distance between eyes of a user wearing an HMD and an image sensor 411 integrated in the HMD. As another example, the distance between the block diagram 410 and the reference point corresponds to a distance between the image sensor 411 and a portion of a physical object within an operating environment.

In some implementations, the block diagram 410 utilizes a combination of a camera warper 422 and a display warper 424 in order to determine the warping function. For example, the camera warper 422 determines camera warping parameters based on a distance between the image sensor 411 and a portion of a physical object within an operating environment. As another example, the camera warper 422 determines camera warping parameters based on a distance between the image sensor 411 and eyes of the user wearing an HMD including the block diagram 410. As yet another, the display warper 424 determines display warping parameters based a distance between the image sensor 411 and a display device 460 included in the block diagram 410. As yet another, the display warper 424 determines display warping parameters based a distance between eyes of a user wearing an HMD and the display device 460.

In some implementations, determining the warping function includes determining a grid size for a grid based on the distance between the block diagram 410 and the reference point. To that end, in some implementations, the block diagram 410 includes a grid generator 430 that obtains depth data from a combination of the depth sensor 414 and time of flight sensor 416. For example, with reference to FIG. 3C, the electronic device 312 determines the first grid 328 associated with the representation of the physical individual 320, and determines the second grid 330 associated with the representation of the physical painting 322. The electronic device 312 determines the first grid 328 based on the corresponding first distance 316 between the electronic device 312 and the physical individual 320. The electronic device 312 determines the second grid 330 based on the corresponding second distance 318 between the electronic device 312 and the physical painting 322.

In some implementations, the block diagram 410 includes a cache manager 452 that manages a cache 450, in order to facilitate image warping. For example, the block diagram 410 obtains the image from the image sensor 411 and stores the image in the cache 450. In some implementations, the cache manager 452 identifies, from the image in the cache 450, a subset of pixels based on a function of the distance between the electronic device and the reference point. For example, the depth sensor 414 provides a distance, which indicates an offset between the image sensor 411 and a portion of the physical object. The cache manager 452 provides the subset of pixels to the warper 420 for warping. Accordingly, the depth sensor 414 provides hints to the cache manager 452 in order to enable more efficient management of the cache 450 (e.g., avoiding cache misses).

In some implementations, the block diagram 410 includes a post processor 440 that processes the warped image from the warper 420. In some implementations, the post processor 440 adds an overlay to the warped image or a portion thereof. For example, in some implementations, the post processor 440 adds a matting overlay to a portion of the warped image in order to account for (e.g., matte or cover) a previously occluded object.

Figure 5:
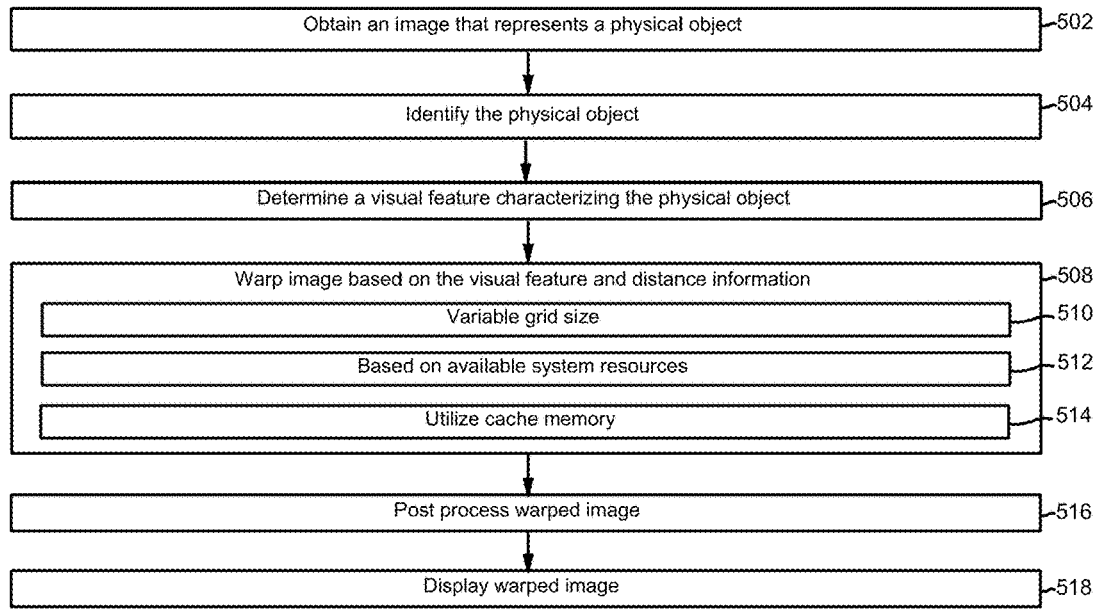
FIG. 5 is an example of a flow diagram of a method of warping an image based on object and distance information in accordance with some implementations.

FIG. 5 is an example of a flow diagram of a method 500 of warping an image based on object and distance information in accordance with some implementations. In various implementations, the method 500 or portions thereof are performed by an electronic device (e.g., the electronic device 100 in FIG. 1 or the electronic device 312 in FIGS. 3A-3H). In various implementations, the method 500 or portions thereof are performed by the block diagram 410 in FIG. 4. In various implementations, the method 500 or portions thereof are performed by a head-mountable device (HMD) including an integrated display device and an image sensor. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, the method 500 includes obtaining an image via an image sensor. As represented by block 504, the method 500 includes identifying, within the image, a physical object represented by a portion of the image. For example, in some implementations, the method 500 includes utilize a combination of instance segmentation and semantic segmentation in order to identify the physical object. In some implementations, the portion of the image corresponds to a location (e.g., pixel location(s)) at which the representation of the physical object was occluded by a previously obtained image. In other words, as compared with the previously obtained images, the representation of the physical object is de-occluded. In some implementations, the physical object corresponds to a static physical object, such as a table. In some implementations, the physical object corresponds to a dynamic physical object, such as a dog running. In some implementations, the physical object corresponds to a portion of a body of a user wearing an HMD, such as the user's extremities, abdomen, legs, and/or the like.

As represented by block 506, the method 500 includes determining, based on the image, a visual feature characterizing the physical object. For example, the visual feature indicates whether the physical object is in the foreground or background of an environment. As another example, the visual feature indicates an object type, such as a textual object, a structural object (e.g., floor, wall, ceiling), a movable object (e.g., table, chair), etc. As yet another example, the visual feature includes a number of sub-features of the physical object, such as edges of the physical object versus the inner portion of the physical object. As yet another example, the visual feature includes a macro label (e.g., a chair) and a set of micro labels (e.g., a first micro label indicates a first leg of the chair, a second micro label indicates a second leg of the chair, a third micro label indicates a seat of the chair, etc.).

As represented by block 508, the method 500 includes warping the portion of the image based on a function of a warping function. The warping function is based on a feature criterion that is satisfied by the visual feature, and based on a distance between the electronic device and a reference point.

In some implementations, the distance between the electronic device and a reference point may indicate an offset between the image sensor and the portion of the physical object. For example, the method 500 includes determining the distance based on depth sensor data, 3D reconstruction data, visual inertia odometry (VIO) data, time of flight data, or a combination thereof. In some implementations, the method 500 includes utilizing a neural network in order to determine the distance. For example, in some implementations, the neural network utilizes a combination of time-of-flight data and images captured by different cameras in order to determine depth information characterizing the portion of the physical object. As another example, in some implementations, the neural network fuses, over time, multiple observations (e.g., perspectives) of the portion of the physical object in order to improve the accuracy and stability of depth information.

In some implementations, the distance between the electronic device and a reference point may indicate an estimated distance between eyes of a user and a display device integrated in the electronic device. For example, the estimated distance is based on a form factor of an HMD. In some implementations, the method 500 includes determining the estimated distance based on a user profile or eye tracking data from an eye tracking sensor integrated in an electronic device. The eye tracking data indicates eye gaze information, such as a focus of the user's eyes, point of regard, etc.

For example, the method 500 includes determining a first warping function for a first physical object having a foreground visual feature that satisfies a first feature criterion. The method 500 includes determining a second warping function for a second physical object having a background visual feature that satisfies a second feature criterion. As another example, the method 500 includes determining a first warping function for a portion of a physical object corresponding to the edges of the physical object, and determining a second warping function for another portion of a physical object corresponding to the inner region (e.g., inside of edges) of the physical object. As yet another example, the method 500 includes determining a first warping function for physical objects having a textual visual feature (e.g., text of a magazine that is sitting on a table), and determining a second warping function for physical objects that do not have the textual visual feature.

In some implementations, warping the portion of the image is performed by a fixed-functionality hardware component, such an ASIC or FPGA chip. By using a fixed-functionality hardware component, the electronic device may utilize fewer processing resources and consume less power than by using a conventional GPU for warping.

As represented by block 510, in some implementations, warping the portion of the image includes utilizing a variable grid size. In some implementations, the method 500 includes determining a grid size for a grid based on the distance between the electronic device and the reference point, and warping the portion of the image as a function of the grid. For example, with reference to FIG. 3C, the electronic device 312 determines the first grid 328 associated with the representation of the physical individual 320, and determines the second grid 330 associated with the representation of the physical painting 322. The electronic device 312 determines the first grid 328 based on the corresponding first distance 316 between the electronic device 312 and the physical individual 320. The electronic device 312 determines the second grid 330 based on the corresponding second distance 318 between the electronic device 312 and the physical painting 322. As another example, with reference to FIG. 3H, the electronic device 312 generates a higher granularity grid for the edges (334a-334b and 336a-336b) of the representation of the physical image 322, and a lower granularity grid for the inner portion of the representation of the physical image 322. In some implementations, the method 500 includes utilizing a larger grid size for more complex physical objects, such as using a larger grid size for a user's hand than for a wall. In some implementations, the method 500 includes utilizing a quad-tree process to implement variable grid size warping. In some implementations, the grid provides per-pixel warping information associated with the image.

As represented by block 512, in some implementations, warping the portion of the image is based on a function of system resource levels. For example, warping the portion of the image is based on available system resources, such as available bandwidth, available memory, available processing resources, etc. In some implementations, the method 500 includes dynamically determining a plurality of respective pixel warp values as system resources change. In some implementations, warping the portion of the image is based on cache resources, in order to avoid cache misses. To that end, in some implementations, as represented by block 514, the method 500 includes utilizing a cache manger that manages a cache memory, such as described with reference to the cache manager 452 and the cache 450 illustrated in FIG. 4.

In some implementations, the method 500 includes determining a confidence level associated with the distance between the electronic device and the reference point, and warping the portion of the image as a function of the confidence level. For example, the confidence level characterizes how well depth data (e.g., from a depth sensor) characterizes the distance between the image sensor and the portion of the physical object.

As represented by block 516, in some implementations, the method 500 includes post processing the warped image, such as via the post processor 400 in FIG. 4. For example, post processing includes adding an overlay to the portion of the image. In some implementations, certain portions of the image, such as an edge of a physical object, are overdrawn and thus not fully warped. Accordingly, cache misses are avoided by foregoing warping the edge. As another example, post processing includes using a low-resolution de-occlusion field cover.

In some implementations, adding the overlay to the portion of the image including matting the portion of the image. Matting may be based on features of the physical object, such as color, texture, etc. In some implementations, the objective of matting is to account for de-occluded areas of the image that were previously occluded in previously obtained images. For example, the method 500 includes blending a previously occluded area of a previously obtained image with a currently occluded area of the image.

As represented by block 518, in some implementations, the method 500 includes generating display data based on the warped portion of the image, and displaying, via a display device integrated in the electronic device (e.g., the display device 460 in FIG. 4), the display data.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at an electronic device including one or more processors, a non-transitory memory, and an image sensor:
   obtaining an image via the image sensor;
   identifying, within the image, a physical object represented by a portion of the image;
   determining, based on the image, a visual feature characterizing the physical object;
   warping, based on the visual feature satisfying a first feature criterion, the portion of the image according to a first warping function that is based on the first feature criterion and a distance between the electronic device and a reference point; and
   warping, based on the visual feature satisfying a second feature criterion that is different from the first feature criterion, the portion of the image according to a second warping function that is based on the second feature criterion and the distance between the electronic device and the reference point.

2. The method of claim 1, further comprising determining a grid size for a grid based on the distance between the electronic device and the reference point, wherein warping the portion of the image is a function of the grid.

3. The method of claim 2, wherein the grid provides per-pixel warping information associated with the image.

4. The method of claim 1, further comprising determining a confidence level associated with the distance between the electronic device and the reference point, wherein warping the portion of the image is a function of the confidence level.

5. The method of claim 1, wherein warping the portion of the image is based on a function of system resource levels.

6. The method of claim 1, wherein warping the portion of the image is performed by a fixed-functionality hardware component.

7. The method of claim 1, further comprising adding an overlay to the portion of the image.

8. The method of claim 7, wherein adding the overlay to the portion of the image includes matting the portion of the image.

9. The method of claim 1, wherein the portion of the image corresponds to a location within another image occluded by the physical object.

10. The method of claim 1, further comprising:
    storing the image in a cache memory;
    identifying, from the image in the cache memory, a subset of pixels based on a function of the distance between the electronic device and the reference point, wherein the distance indicates an offset between the image sensor and a portion of the physical object; and
    retrieving, from the cache memory, the subset of pixels for warping.

11. The method of claim 10, wherein identifying the subset of pixels includes providing, to the cache memory, a cache hint that is based on depth information characterizing the physical object.

12. The method of claim 1, further comprising:
    generating display data based on the warped portion of the image; and
    displaying, via a display device integrated in the electronic device, the display data.

13. The method of claim 1, wherein the distance between the electronic device and the reference point indicates an offset between the image sensor and a portion of the physical object.

14. The method of claim 1, wherein the distance between the electronic device and the reference point indicates an estimated distance between eyes of a user and a display device integrated in the electronic device.

15. A system comprising:
- an image sensor to obtain an image;
- a visual feature identifier to:
  - identify, within the image, a physical object represented by a portion of the image; and
  - determine, based on the image, a visual feature characterizing the physical object; and
- a warper to:
  - warp, based on the visual feature satisfying a first feature criterion, the portion of the image according to a first warping function that is based on the first feature criterion and a distance between the system and a reference point; and
  - warp, based on the visual feature satisfying a second feature criterion that is different from the first feature criterion, the portion of the image according to a second warping function that is based on the second feature criterion and the distance between the system and the reference point.

16. The system of claim 15, further comprising a grid generator to determine a grid size for a grid based on the distance between the system and the reference point, wherein the warper warps the portion of the image based on a function of the grid.

17. The system of claim 16, wherein the grid provides per-pixel warping information associated with the image.

18. The system of claim 15, wherein the warper determines a confidence level associated with the distance between the system and the reference point, and wherein the warper warps the portion of the image based on a function of the confidence level.

19. The system of claim 15, wherein warping the portion of the image is based on a function of system resource levels.

20. A non-transitory computer-readable medium including instructions, which, when executed by an electronic device including one or more processors and an image sensor, cause the electronic device to:
- obtain an image via the image sensor;
- identify, within the image, a physical object represented by a portion of the image;
- determine, based on the image, a visual feature characterizing the physical object;
- warp, based on the visual feature satisfying a first feature criterion, the portion of the image according to a first warping function that is based on the first feature criterion and a distance between the electronic device and a reference point; and
- warp, based on the visual feature satisfying a second feature criterion that is different from the first feature criterion, the portion of the image according to a second warping function that is based on the second feature criterion and the distance between the electronic device and the reference point.

* * * * *